United States Patent
Eliseev et al.

(10) Patent No.: US 8,966,049 B1
(45) Date of Patent: Feb. 24, 2015

(54) SYSTEM AND METHOD FOR LINKING VARIOUS PROTOCOLS FOR CONTROLLING DEVICES WITH THEIR OWNERS

(71) Applicant: Kaspersky Lab ZAO, Moscow (RU)

(72) Inventors: Evgeny Y. Eliseev, Moscow (RU); Denis A. Minchenko, Moscow (RU); Andrey A. Pravdivy, Moscow (RU); Konstantin M. Filatov, Moscow (RU); Victor V. Yablokov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/250,060

(22) Filed: Apr. 10, 2014

(30) Foreign Application Priority Data

Dec. 5, 2013 (RU) .................................. 2013153763

(51) Int. Cl.
G06F 15/16 (2006.01)
H04L 12/24 (2006.01)
G06F 12/00 (2006.01)

(52) U.S. Cl.
CPC .................................. *H04L 41/0893* (2013.01)
USPC .......................................................... 709/223

(58) Field of Classification Search
CPC ... H04L 67/1002; H04L 69/329; H04L 29/06; H04L 29/12009; H04L 45/00; H04L 29/12783; H04L 47/10; H04L 61/35; H04L 67/1008; H04L 67/2814; H04L 69/16; H04L 69/40; H04L 2029/06054; H04L 29/1233
USPC .................................. 709/203, 223–229, 250
See application file for complete search history.

(56) References Cited

U.S. PATENT DOCUMENTS

| | | | | |
|---|---|---|---|---|
| 5,978,568 | A * | 11/1999 | Abraham et al. | 709/224 |
| 6,226,679 | B1 * | 5/2001 | Gupta | 709/230 |
| 7,978,691 | B1 | 7/2011 | Cole | |
| 8,259,568 | B2 | 9/2012 | Laudermilch et al. | |
| 8,495,700 | B2 | 7/2013 | Shahbazi | |
| 8,767,694 | B2 | 7/2014 | Yablokov | |
| 8,839,234 | B1 | 9/2014 | Voronkov et al. | |
| 2002/0091753 | A1 * | 7/2002 | Reddy et al. | 709/202 |
| 2008/0062962 | A1 * | 3/2008 | Luck et al. | 370/352 |
| 2008/0070495 | A1 | 3/2008 | Stricklen et al. | |
| 2009/0037732 | A1 * | 2/2009 | Boccon-Gibod et al. | 713/168 |
| 2010/0115582 | A1 | 5/2010 | Sapp et al. | |
| 2011/0167470 | A1 | 7/2011 | Walker et al. | |
| 2013/0007245 | A1 | 1/2013 | Malik et al. | |
| 2013/0104184 | A1 | 4/2013 | Landry et al. | |
| 2013/0263212 | A1 | 10/2013 | Faltyn et al. | |
| 2014/0095682 | A1 | 4/2014 | Yablokov | |
| 2014/0181801 | A1 | 6/2014 | Voronkov et al. | |

OTHER PUBLICATIONS

MDM Mobile Device Manager Manual. http://www.3cx.com Version 7.1—Last updated May 15, 2014.
SysAid. A Service Desk That Has All the IT Essentials http://www.sysaid.com/product/sysaid © 2002-2014 as accessed on Sep. 26, 2014.

* cited by examiner

*Primary Examiner* — Zarni Maung
(74) *Attorney, Agent, or Firm* — Patterson Thuente Pedersen, P.A.

(57) ABSTRACT

System and methods for the association of one or more devices over a computer network. A management agent module running on a device coupled to the network is configured to communicate with a server agent module running on a management server. An association linking the management agent with the server agent is created by the management server. Associations with device users and the agents managing the devices can also be made. Associations allow network administration commands and policy controls to be issued at a user, rather than device, level.

9 Claims, 8 Drawing Sheets

SYSTEM AND METHOD FOR LINKING VARIOUS PROTOCOLS FOR CONTROLLING DEVICES WITH THEIR OWNERS

CLAIM TO PRIORITY

This application claims the benefit of Russian Federation Patent Application No. 2013153763 filed Dec. 5, 2013, the substance of which is incorporated by reference herein.

FIELD OF THE INVENTION

The invention relates generally to device management and, more particularly, to systems and methods for integrating and managing mobile devices.

BACKGROUND OF THE INVENTION

Device operating systems typically support various protocols for managing a mobile device through management agents. Mobile device management agents are designed to perform various tasks, such as, for example, setting of policies (minimum password length, device blockage rules and maximum number of attempts for incorrect password input), or remote launch or deletion of certain data from a lost or stolen device.

The management protocols that are supported typically depend on the mobile device used and on the operating system installed on the device. For example, in smartphones such as an iPhone, under the control of the iOS operating system, starting from Version 4.0, support of Exchange ActiveSync (EAS) and Mobile Device Management (iOS MDM) protocols is provided. Typically, the sets of management functions provided in each of the protocols are different. For example, the EAS protocol provides the function of setting the time for storing email messages for synchronization, as well as the device encoding requirement function, neither of which are provided in the iOS MDM protocol. Further, the iOS MDM protocol provides, for example, the functions of remote blockage of the device and of password reset, neither of which are provided in the EAS protocol.

Often, a single corporate network uses multiple mobile devices, each of which can support various management protocols and, consequently, have multiple sets of functions for control by the respective management agents. These protocols are presented to the network administrator as separate connections, and are managed by separate services, which do not have a direct connection with a specific device and its owner. As a result, managing such devices is not convenient for the administrator of a network; for example, a large corporate network. In order to apply policies for a certain user, an administrator is required to manually select the device of that user and the protocol under which the policy will be applied, which is labor-consuming, and particularly in a large network environment.

Existing solutions partially solve the aforementioned problems. For example, some software solutions available on the market, such as 3CX and SysAid, prompt the user to manually connect the management agent with the management center on a corporate network.

In another example, U.S. Pat. No. 8,259,568 discloses methods for automatic identification of the device being connected, but does not solve the task of associating management agents with the management center. U.S. Pat. No. 8,259,568 addresses the issue of applying policies to user devices and gathering information on a device that allows the device to be identified, but does not solve the problem of determining the device user or associating the management agent with the user and with the management center on a network.

While these approaches have addressed certain aspects of the challenges in managing remote devices, these approaches remain cumbersome and incomplete. A more effective and efficient solution is needed.

SUMMARY OF THE INVENTION

One aspect of the invention is directed to simplifying the management of computer networks by associating computer network device users with the agents managing the devices. In a feature and advantage of embodiments of the invention, computer network administrators are not required to maintain knowledge of which agents manage which devices, or which users belong to which devices. Instead, management commands and policies are applied at the user level (or user group level) in order to manage the connected devices.

According to an embodiment, a system for the association of one or more devices over a computer network comprises one or more devices operably coupled to a computer network, each of the devices comprising a set of instructions executable by device hardware and stored in a device non-transitory storage medium that, when executed, cause the device hardware to implement a management agent module configured to communicate according to a management protocol; and a management server operably coupled to the computer network comprising a set of instructions executable by server hardware and stored in a server non-transitory storage medium that, when executed, cause the server hardware to implement a server agent module configured to communicate to the management agent module according to the management protocol, wherein an association is made by the management server to link the management agent module with the server agent module.

In another embodiment, in a computer system executable by management server hardware and stored in a non-transitory storage medium that, when executed, cause the management server hardware to implement, a method of associating one or more devices over a computer network, the method comprises detecting an unregistered management agent accessing the computer network, the unregistered management agent implemented by device hardware and stored in a device non-transitory storage medium, gathering information about the device on which unregistered management agent was detected, determining an identification of the device based on at least the information gathered about the device, determining an identification of a user of the device, and associating the unregistered management agent with the user.

In another embodiment, in a computer system executable by management server hardware and stored in a non-transitory storage medium that, when executed, cause the management server hardware to implement a method of applying a policy instruction using a management server to one or more devices over a computer network, each of the one or more devices comprising a management agent module configured to communicate according to a management protocol, the method comprises receiving the policy instruction, identifying at least one user for whom the policy instruction is to be applied, receiving user data about at least one of the one or more devices, selecting a management agent module for each device associated with the user data, and applying the policy instruction to the one or more devices associated with the selected management agent module.

A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines (e.g., system virtual machines, operating system-level virtual machines, process virtual machines, or any combination thereof) that in turn are executed on one or more physical machines. It will be understood by persons of skill in the art that features of the invention may be realized by a variety of different suitable machine implementations.

The system includes various modules, each of which is constructed, programmed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

Figure 1:
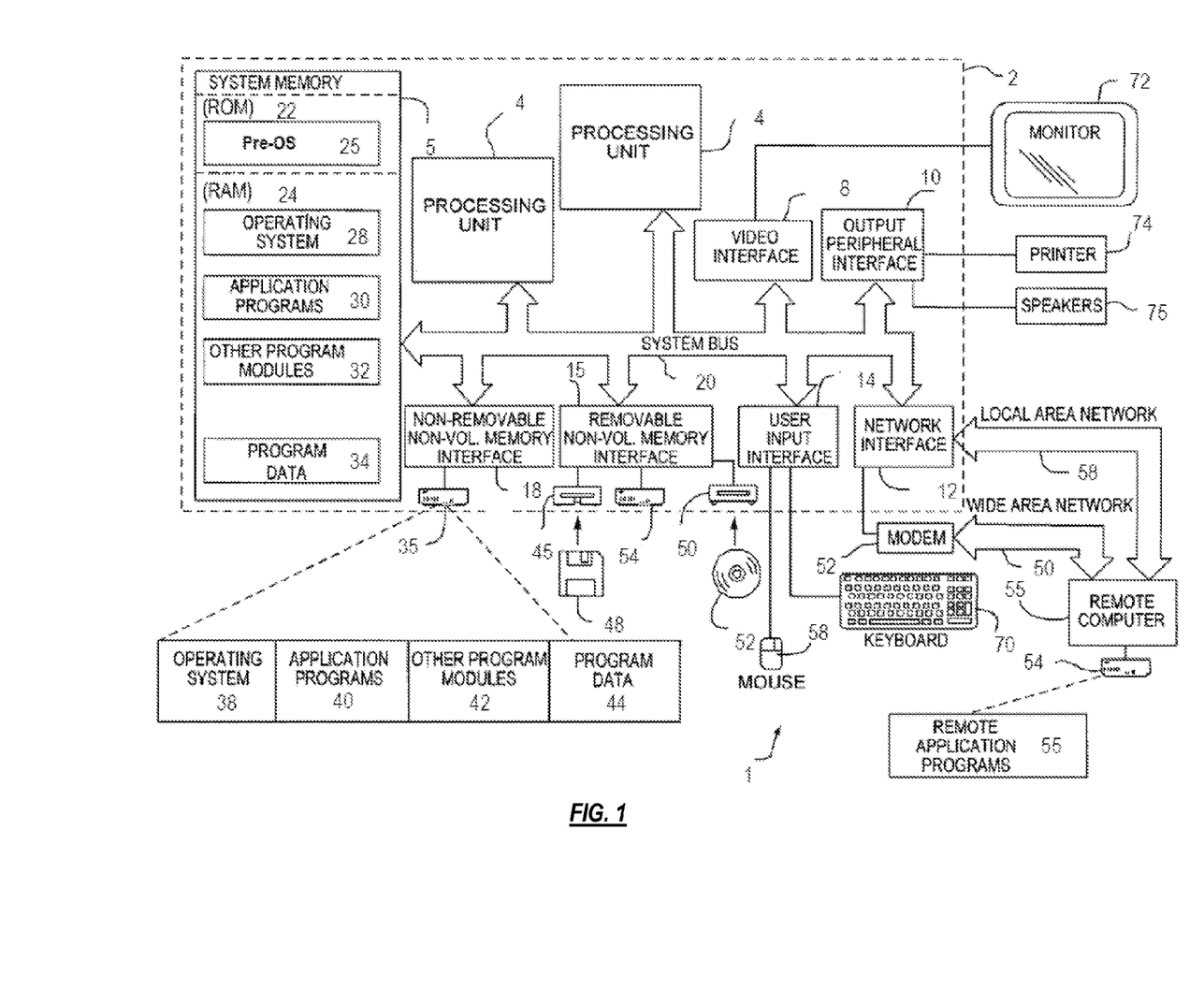
FIG. 1 is a block diagram illustrating an example of a general-purpose computer system on which aspects of the invention may be carried out.

FIG. 1 is a diagram illustrating a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and nonremovable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a pre-operating system environment 25 to help communicate with the other portion of the computer 2. The pre-operating system environment 25 can include basic input/output system (BIOS) functionality, as well as additional functionality such as specialized applications that may be executed without the operating system. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 75 or other peripherals to provide additional functionality to the computer 2.

Various alternative configurations and implementations of the computer are also contemplated. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

Figure 2:
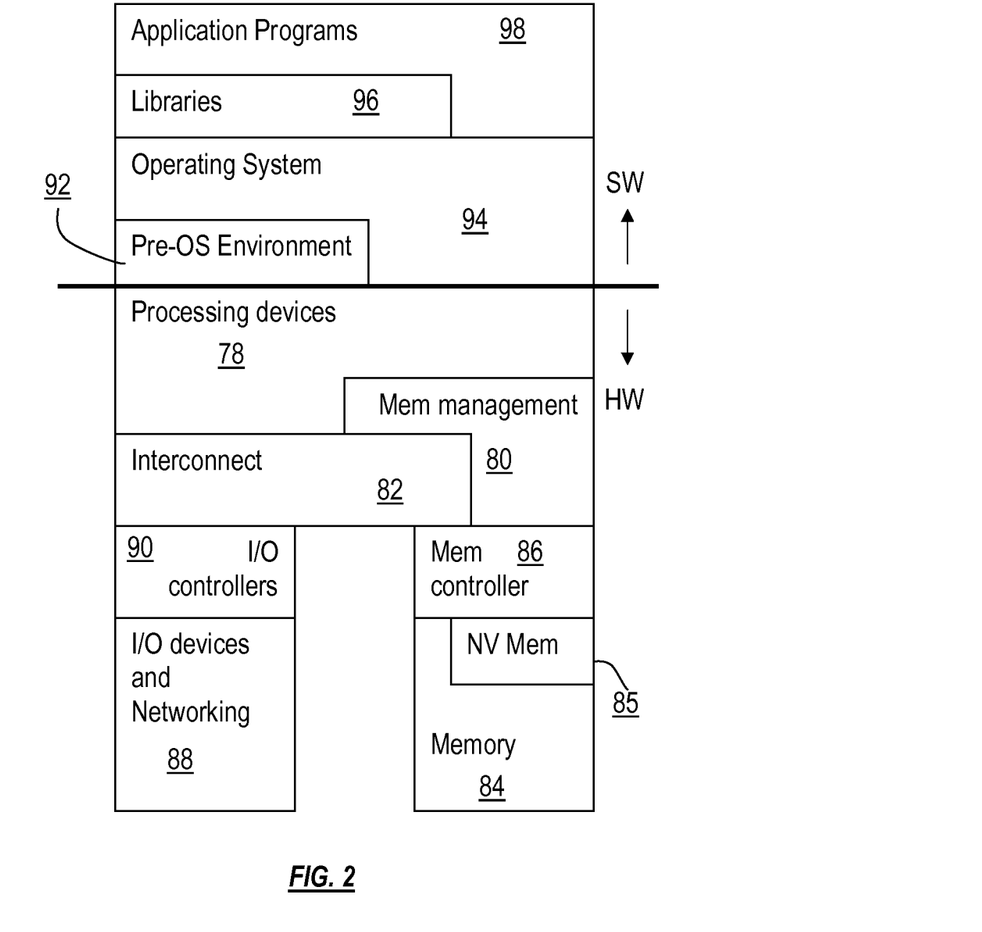
FIG. 2 is a diagram illustrating a typical hardware and software architecture of a computer system such as the one depicted in FIG. 1, in which various interfaces between hardware and software components are shown.

FIG. 2 is a diagram illustrating an exemplary hardware and software architecture of a computer system such as the one depicted in FIG. 1, in which various interfaces between hardware components and software components are shown. As indicated by HW, hardware components are represented below the divider line, whereas software components denoted by SW reside above the divider line. On the hardware side, processing devices 78 (which can include one or more microprocessors, digital signal processors, etc., each having one or more processor cores, are interfaced with memory management device 80 and system interconnect 86. Memory management device 80 provides mappings between virtual memory used by processes being executed, and the physical memory. Memory management device 80 can be an integral part of a central processing unit which also includes the processing devices 78.

Interconnect 82 includes the memory, data, and control busses, as well as the interface with peripherals, e.g., PCI, USB, etc. Memory 84 (e.g., dynamic random access memory—DRAM) and non-volatile memory 85 such as flash memory (i.e., electrically-erasable read-only memory—EEPROM) are interfaced with memory management device 80 and interconnect 82 via memory controller 86. This architecture can support direct memory access (DMA) by peripherals. I/O devices, including video and audio adapters, disk storage, external peripheral busses such as USB, Bluetooth, etc, as well as network interface devices such as those communicating via Ethernet or Wi-Fi interfaces, are collectively represented as I/O devices and networking 88, which interface with interconnect 82 via corresponding I/O controllers 90.

On the software side, a pre-operating system (pre-OS) environment 92, which is executed at initial system start-up and is responsible for initiating the boot-up of the operating system. One traditional example of pre-OS environment 92 is a system basic input/output system (BIOS). In present-day systems, a unified extensible firmware interface (UEFI) is implemented. Pre-OS environment 92, described in greater detail below, is responsible for initiating the launching of the operating system, but also provides an execution environment for embedded applications according to certain aspects of the invention. Operating system 94 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 94 provides device drivers, and a variety of common services such as those that facilitate interfacing with peripherals and networking, that provide abstraction for application programs so that the applications do not need to be responsible for handling the details of such common operations. Operating system 94 additionally provides a graphical user interface (GUI) that facilitates interaction with the user via peripheral devices such as a monitor, keyboard, mouse, microphone, video camera, touchscreen, and the like.

Libraries 96 include collections of program functions that provide further abstraction for application programs. These include shared libraries, dynamic linked libraries (DLLs), for example. Libraries 96 can be integral to the operating system 94, or may be added-on features, or even remotely-hosted. Libraries 96 define an application program interface (API) through which a variety of function calls can be made by application programs to invoke the services provided by the operating system 94. Application programs 98 are those programs that perform useful tasks for users, beyond the tasks performed by lower-level system programs that coordinate the basis operability of the computer system itself.

Figure 3:
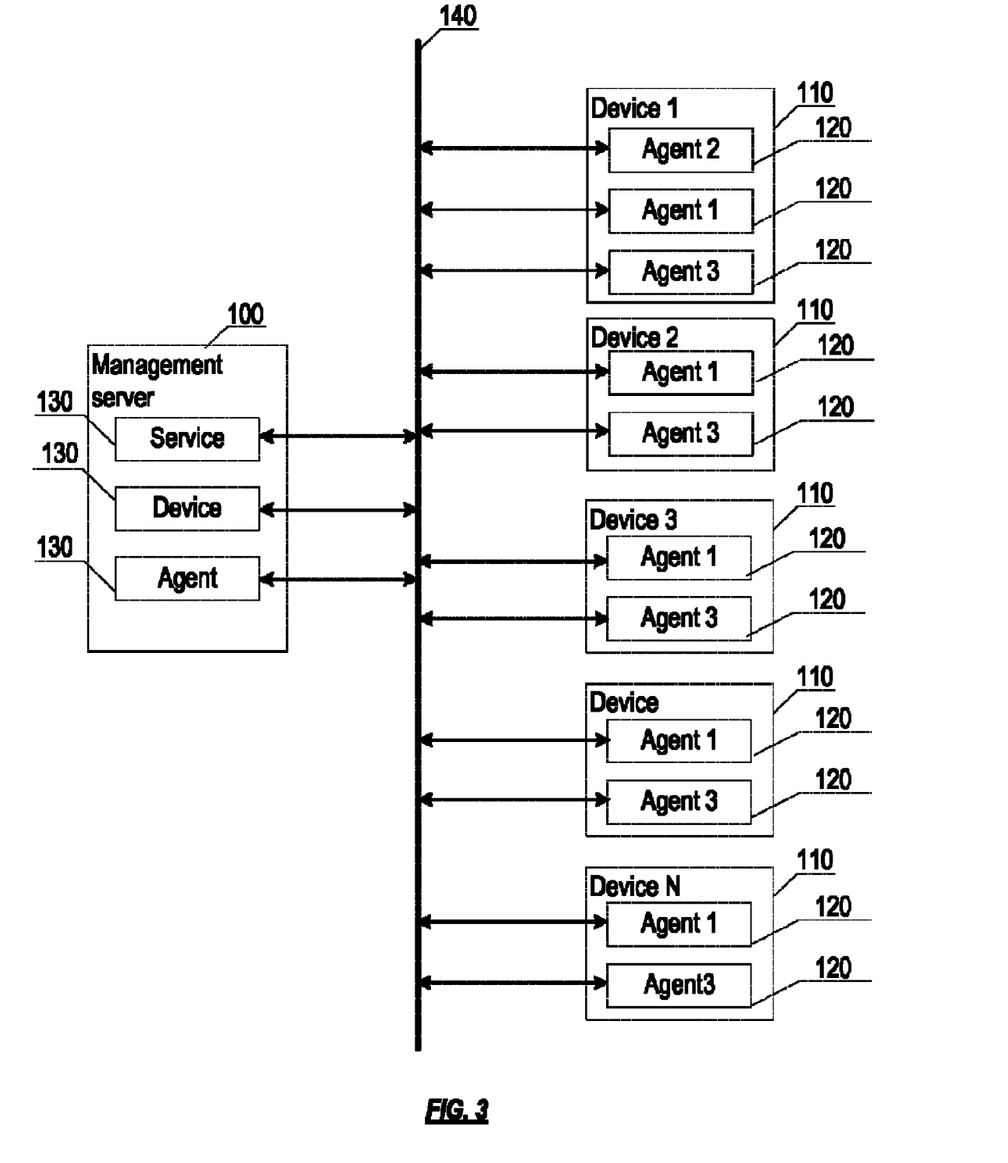
FIG. 3 is a block diagram illustrating mobile devices networked with a management server.

FIG. 3 is a block diagram illustrating a plurality of mobile devices networked with a management server 100 on, for example, a corporate network 140. In an embodiment, each mobile device 110 comprises at least one agent 120, each of which supports one or multiple management protocols. In an embodiment, management server 100 comprises one or more services 130 configured to interface with the respective agents 120. As described above, device management agents 120 can comprise software launched on the managed device. In an embodiment, this software is part of the OS. Management agents 120 are configured to process information about the configuration and functioning of the managed devices and convert the information into or from a format convenient for supporting the protocol. Mobile devices 110 can be connected to management server 100 using various communication technologies known to one skilled in the art, such as, for example, Wi-Fi, Bluetooth, GSM, etc. In certain embodiments where there is no common agent 120 or service 130 which would support all protocols, management server 100 cannot manage all mobile devices 110 using a single specific protocol. Further, if mobile devices 110 all belong to a single user, setting up the policy for that user separately on each device 110 for the selected protocol is required.

Figure 4:
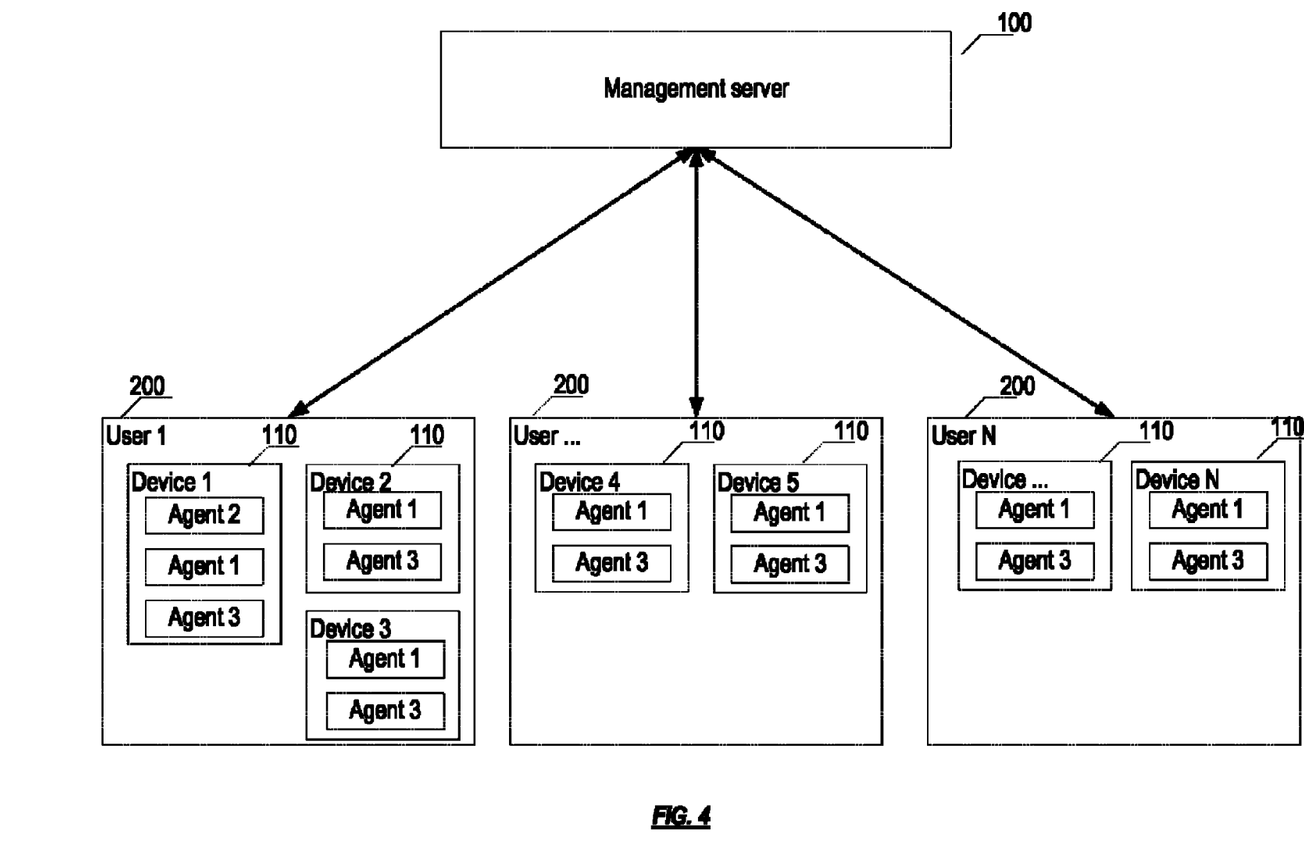
FIG. 4 is a block diagram illustrating a management server and an association by specific users, according to an embodiment of the invention.

Referring to FIG. 4, association of devices 110 and management agents 120 with a specific user or users 200 is illustrated. As shown, the management of agents 120 is performed for each user 200 in a centralized way, rather than separately or individually. If a new agent 120 is accessible on a network, the agent 120 is built into the existing topology (for example, precisely associated with the user and the device). In such an association, the administrator of the management server 100 does not see multiple connections from management agents 120 installed on devices 110 and for the server 100 (and not associated with the device and the user), but rather individual users 200, for whom the policies are applied. In such a system, the administrator of management server 100 sends management commands to users 200 and, in embodiments, user groups, and is therefore does not need to know the topology of what agents manage devices 100 and to which users 200 devices 100 belong. Thus, the management of devices is carried to an advantageous abstraction level.

Figure 5:
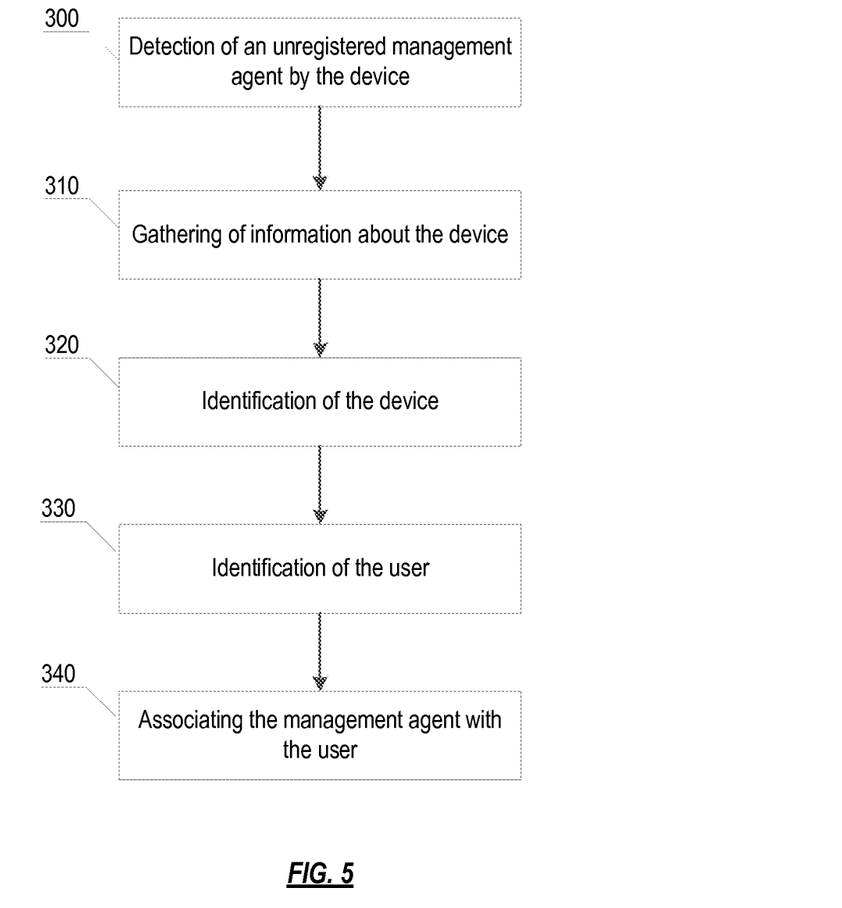
FIG. 5 is a flow diagram illustrating certain operations of a method of associating a user with a device management agent, according to an embodiment of the invention.

FIG. 5 is a flow diagram illustrating certain operations of a method of associating a user 200 with one or more devices 110 and one or more device management agents 120, according to an embodiment of the invention. At 300, an unregistered management agent 120 for a device 110 is detected. In an embodiment, detection occurs at the attempt to establish connection with the management server 100. In another embodiment, the unregistered agent is detected while polling the devices connected to the network for accessibility of network services or management agents. At 310, information is gathered about device 110 on which unregistered management agent 120 was detected, and, in embodiments, about management agent 120 itself. The information gathered at 310 can comprise any information that identifies the device 110 or that assists in identifying the device 110. For example, the gathered information can be addresses of various network levels (MAC, IP), installed services, information about authentication from protocol headers, the international mobile equipment identifier (IMEI), the Integrated Circuit Card ID, the protocol used by the management agent 120, the operating system model, the Device ID, or other data or information, as is readily understood by one skilled in the art. At 320, an identification of the device 110 on which management agent 120 is installed is determined, based on at least information gathered at 310. In an embodiment, identification of device 110 comprises recognition of device 110 already known on the network. In another embodiment, if device 110 was previously unknown on the network, the device 110 will be identified (created) by entering its identification data in an operably coupled database, as described further below. At 330, identification of the user 200 to whom the device belongs (or us used by) is made. In an embodiment, when device 110 is already known on the network, user 200 of device 110 is identified through a request to the database, as described further below. In another embodiment, when device 110 is previously unknown, methods are used that allow matching of the user 200 and the device 110. For example, if a previously unknown device 110 accesses the corporate network, authentication data are requested from device 110, or a management agent 120 gathers registration data from device 110. In an embodiment, the data provided by device 110 precisely matches device 110 that is registered on the network. In another embodiment, the data provided by device 110 does not precisely identify device 110, but one or more algorithms are used to evaluate the data provided in order to identify device 110. At 340 (i.e. when management agent 120 is known and device 110 and its user 200 are identified), an association is made of the device's management agent 120 with the device's user 200. For example, a user—device—agent match in an operably coupled database can be specified. In other embodiments, other value or data field matches or links can be specified, according to, for example, the particular application.

Figure 6:
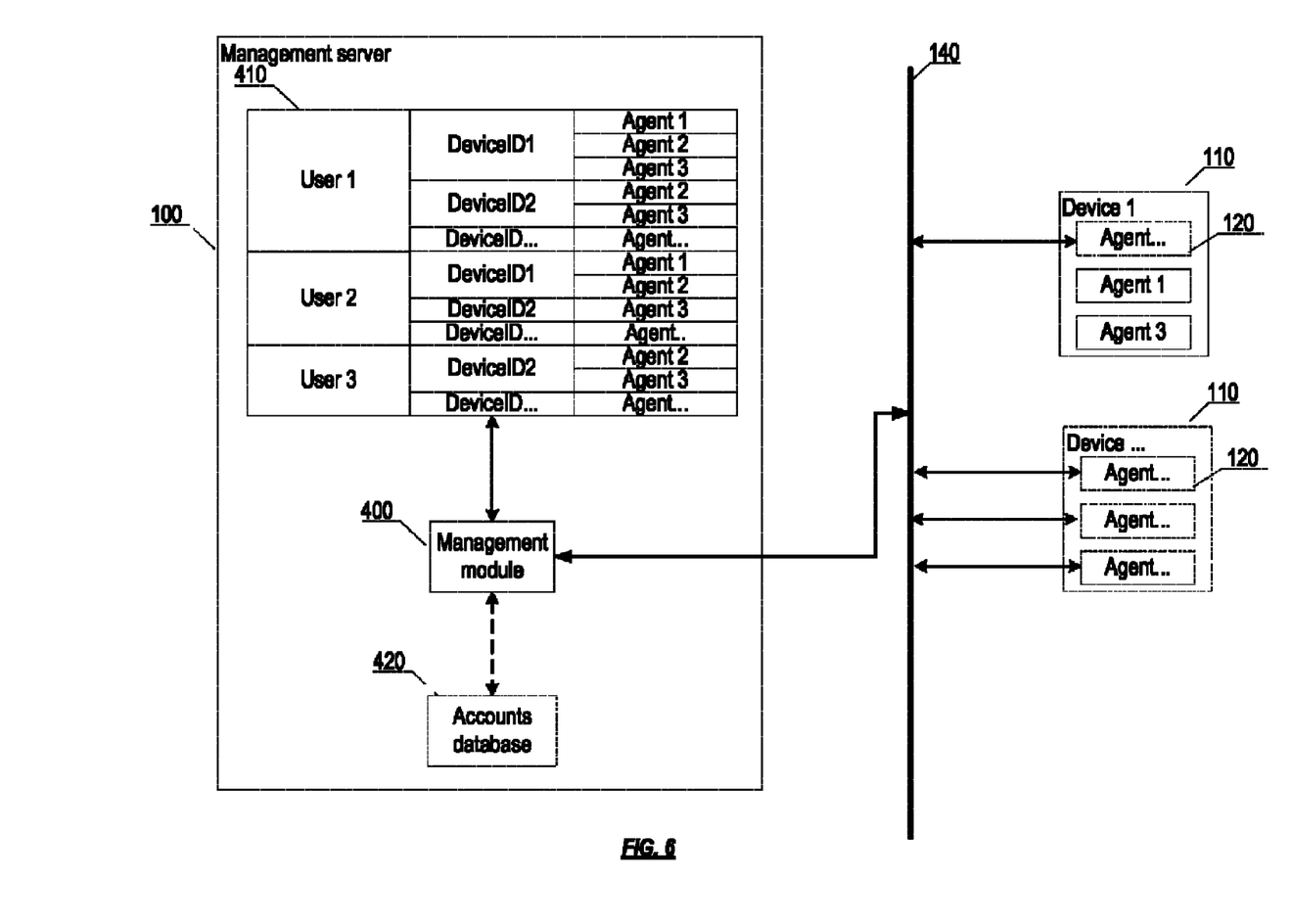
FIG. 6 is a block diagram of a system including users associated with one or more device management agents, according to an embodiment of the invention.

FIG. 6 is a block diagram of a system including users 200 associated with one or more device management agents 120, according to an embodiment of the invention. According to an embodiment, a management module 400 is configured to detect an unregistered device management agent 120. Management module 400 can gather information about the device 110 and the installed agent 120. Management module 400 is further configured to identify the device 110 on which the management agent 120 is installed. In an embodiment, device identification comprises recognition of a device 110 already known on that network. For example, during the recognition, the identification data of device 110 is compared to the identification data of known devices from, for example, database 410. In embodiments, the identification data can comprise media access control address (MAC address), Internet Protocol address (IP address) data, or other suitable hardware or network data, or combinations thereof.

In an example embodiment, database 410 is illustrated in FIG. 6. Database 410 comprises, for example three types of data: user data, identification data of user devices 110, and identification data of management agents 120. For example, identification data can comprise a type of supported protocol and an identification number of the device on which the agent is installed (e.g. EASDeviceID). In embodiments, the agent type (ActiveSync, iOS MDM, etc.) can be used for identification. Other types of data can be stored in database 410 in other embodiments. Accordingly, additional or fewer fields in database 410 can be utilized for identification of the respective system components. In another embodiment, if the device 110 was previously unknown on the network, device 110 can be identified by entering the device 110 identification data in database 410. Management module 400 can then identify the user 200 to whom the device 110 belongs. In an embodiment, when device 110 is already known on the network, the user 200 of device 110 is identified through a request transmitted to database 410. In another embodiment, when device 110 is previously unknown, methods are used which allow to match user 200 and device 110. For example, if a previously unknown device 110 accesses the corporate network 140, authentication data can be requested from device 110 for the purpose of accessing the network. In an embodiment, authentication data can precisely match user 200 that is registered on the network, and is stored, for example, in an accounts database 420. In embodiments, accounts database 420 can be used by management server 100 during authorization. In embodiments, accounts database 420 is further configured to store policies. Management module 400, having identified the user of a previously unknown device, is configured to transmit or otherwise enter the received information in database 410. When management agent 120 is known and device 110 and its user 200 are identified, the device's management agent 120 can be associated with the device's user. For example, a user—device—agent match can be specified in database 410. In other embodiments, other value or data field matches or links can be specified, according to, for example, the particular application.

In operation, the system of FIG. 6 can be utilized to simplify the management of network objects. In an embodiment, for a device 110 not previously used on the network, a device management agent 120 can be downloaded. Such download can be from, an application store, a website, a networked device, or any other suitable source. Management agent 120 can then be installed. During installation, the device management agent 120 receives the port and address of the administration server 100, for example, http://sc.kaspersky.com:8080. After installation, agent 120 is connected to administration server 100. In an embodiment, management module 400 detects a connection from an unregistered device management agent 120. Management module 400 organizes a number of requests to device 110 in order to receive identification data of device 110 and identifies the type of device management agent 120 by the type of the protocol used by management agent 120. Management module 400 receives identification data from the device 110. Management module 400 is configured to access database 410 and compare the received identification data with the identification data of known devices. In an embodiment where management module 400 does not find the device being used among the known devices, management module 400 identifies device 110 by placing the identification data of a new device 110 in the database 410. Management module 400 requests authentication data used by the device's user to access the resources of a corporate network 140. Then, the management module 400 makes a request for the accounts database 420, in order to identify the user whose authentication data is provided by device 110. Comparing the data, management module 400 identifies the user. In embodiments, the data about the user are also entered in the database 410. Finally, management module 400 associates the user with the device management agent 120. The identification data of the management agent 120 used on the device 110 are entered in the database 410.

Figure 7:
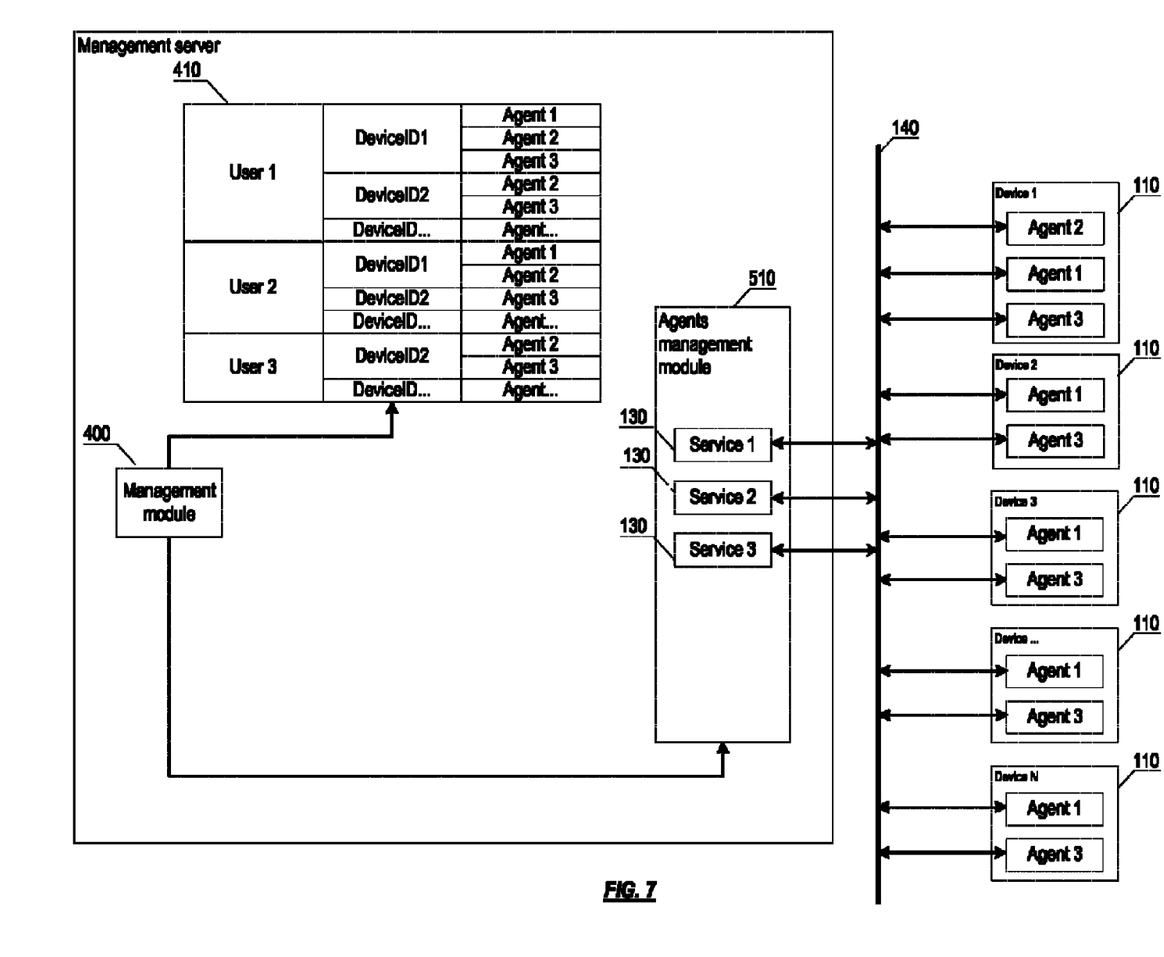
FIG. 7 is a block diagram of a system for associating one or more users with device management agents, according to an embodiment of the invention.
Figure 8:
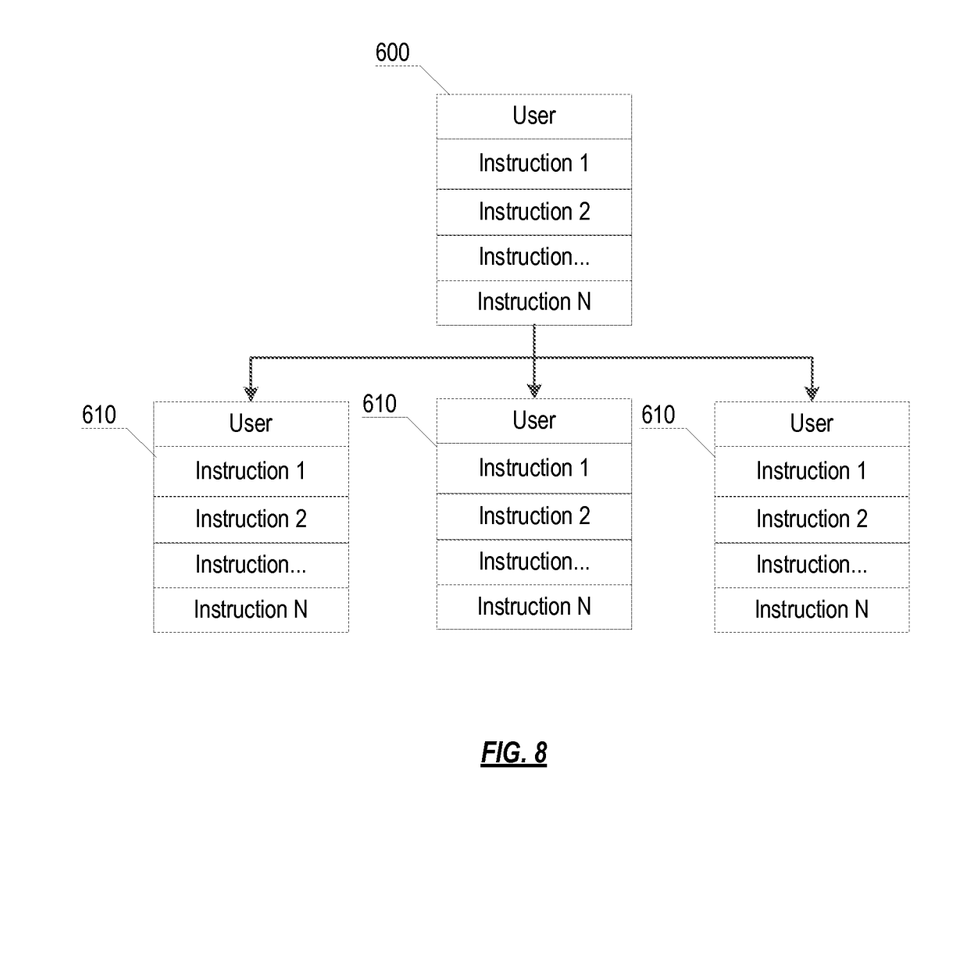
FIG. 8 is a block diagram of options for presenting policies in a management server system, according to an embodiment of the invention.

Referring to FIG. 7, an example associated system is illustrated. Once an associated system is generated, the administrator of management server 100 can simply apply a policy to a user or a group of users. In an embodiment, a policy 600 is illustrated in FIG. 8. In an embodiment, management module 400 receives this policy, and, by the policy's header, identifies the user for which it is needed to perform management. In embodiments, data fields other than the header can be utilized in order to identify the intended user or group of users. Management module 400 is further configured to receive, from database 410, information about devices 110 belonging to the user specified in the policy 600 and management agents 120 installed on these devices. Management system 400 selects a management agent 120 for each of the user's devices for policy application. A detailed description of this technology is provided in U.S. Patent Application Pre-Grant Publication No. 2014/0095682, which is incorporated by reference herein.

A management agent 120 can be selected, for example, for its ability to apply a policy as quickly as possible. In embodiments, a particular management agent 120 can be selected for other reasons including type or management protocol(s) supported, or relative or network proximity, for example. After selecting a particular management agent 120, management module 400 can create a unique token and create modified policies 610, where the created token replaces the information about the user in the policy header. In an embodiment, the unique token can be for example DeviceID+AgentID, although other tokens are also considered, as will be apparent to one skilled in the art. Management module 400 is configured to send, for example, modified policies 610 to agents management module 510. In an embodiment, the number of modified policies 610 matches the number of the devices belonging to the user. In an embodiment, agents management module 510 is configured to use the token to select the relevant service 130 for the management agent 120 specified in the token, and apply the policy or policies to the relevant device(s). In this manner, the administrator does not need to know what devices belong to the user and what agents are installed on them for the management of the devices. The proposed invention allows to create a system using which the administrator can perform management by the users, while the system can automatically perform management by the devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded.

Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for associating one or more devices over a computer network, the method being executable by a computer system that includes management server hardware, and comprising:
    detecting, by the computer system, an unregistered management agent accessing the computer network, the unregistered management agent implemented by device hardware and stored in a device non-transitory storage medium;
    gathering, by the computer system, information about the device on which unregistered management agent was detected;
    determining, by the computer system, an identification of the device based on at least the information gathered about the device;
    determining, by the computer system, an identification of a user of the device; and
    associating, by the computer system, the unregistered management agent with the user.

2. The method of claim 1, wherein detecting an unregistered management agent comprises detecting the unregistered management agent upon an attempt to access the management server.

3. The method of claim 1, wherein detecting an unregistered management agent comprises detecting the unregistered management agent by polling the one or more devices connected to the computer network.

4. The method of claim 1, further comprising gathering information about the unregistered management agent.

5. The method of claim 1, wherein determining an identification of the device comprises recognizing a device known on the computer network by comparing and matching the information about the device to data stored in a database operably coupled to the management server.

6. The method of claim 1, wherein determining an identification of the device comprises entering the information about the device in a database operably coupled to the management server.

7. The method of claim 1, wherein determining an identification of the user comprises comparing and matching the identity of the user to data stored in a database operably coupled to the management server.

8. The method of claim 1, wherein determining an identification of the user comprises entering the identity of the user in a database operably coupled to the management server.

9. The method of claim 1, further comprising associating a second unregistered management agent with the user.

* * * * *